(12) United States Patent
Rioux

(10) Patent No.: US 12,551,264 B2
(45) Date of Patent: Feb. 17, 2026

(54) BIOCOMPATIBLE METAL DEVICES FOR DELIVERING ABLATIVE ENERGY

(71) Applicant: Robert F. Rioux, Ashland, MA (US)

(72) Inventor: Robert F. Rioux, Ashland, MA (US)

(*) Notice: Subject to any disclaimer, the term of this patent is extended or adjusted under 35 U.S.C. 154(b) by 848 days.

(21) Appl. No.: 17/614,902

(22) PCT Filed: May 29, 2020

(86) PCT No.: PCT/US2020/035088
§ 371 (c)(1),
(2) Date: Nov. 29, 2021

(87) PCT Pub. No.: WO2020/243406
PCT Pub. Date: Dec. 3, 2020

(65) Prior Publication Data
US 2023/0255680 A1    Aug. 17, 2023

Related U.S. Application Data

(60) Provisional application No. 62/855,472, filed on May 31, 2019, provisional application No. 62/855,477, filed on May 31, 2019.

(51) Int. Cl.
*A61B 18/14*    (2006.01)
*A61B 17/00*    (2006.01)
(Continued)

(52) U.S. Cl.
CPC .. *A61B 18/1442* (2013.01); *A61B 2017/0023* (2013.01); *A61B 2018/00077* (2013.01);
(Continued)

(58) Field of Classification Search
CPC ............ A61B 18/1442; A61B 18/1445; A61B 2018/00077; A61B 2018/00107
See application file for complete search history.

(56) References Cited

U.S. PATENT DOCUMENTS 5,484,436 A    1/1996    Eggers et al.
6,210,411 B1 *    4/2001    Hofmann ............... A61B 18/14
                                                            606/49
(Continued)

FOREIGN PATENT DOCUMENTS

JP    6-511400    12/1994
JP    2010-518920 A    6/2010
(Continued)

OTHER PUBLICATIONS

International Search Report dated Aug. 17, 2020 for International Application No. PCT/US2020/035088 (2 pages).
(Continued)

*Primary Examiner* — Sean W Collins
(74) *Attorney, Agent, or Firm* — Brown Rudnick LLP; Matthew P. York

(57) ABSTRACT

The present disclosure is directed to ablative devices comprising biocompatible materials in the form of a mesh to provide porosity to allow for the conveyance of conductive fluid to target tissue to be ablated. The mesh also increases the durability of the biocompatible material, reducing the amount of biocompatible material needed for both reusable devices and disposable ablative devices, such as ablative forceps and ablative probes.

12 Claims, 19 Drawing Sheets

(51) Int. Cl.
    *A61B 18/00*         (2006.01)
    *A61B 18/12*         (2006.01)
    *A61B 18/16*         (2006.01)

(52) U.S. Cl.
    CPC ............... *A61B 2018/00107* (2013.01); *A61B 2018/00577* (2013.01); *A61B 2018/126* (2013.01); *A61B 2018/1462* (2013.01); *A61B 2018/1472* (2013.01); *A61B 2018/162* (2013.01); *A61B 2218/002* (2013.01)

(56) References Cited

U.S. PATENT DOCUMENTS

| | | | |
|---|---|---|---|
| 2007/0185482 A1* | 8/2007 | Eder | A61B 18/14 606/49 |
| 2008/0200914 A1* | 8/2008 | Hanlon | A61B 18/1442 606/48 |
| 2012/0330310 A1* | 12/2012 | Takashino | A61B 18/148 606/45 |
| 2013/0006241 A1 | 1/2013 | Takashino | |
| 2014/0228831 A1 | 8/2014 | Fischer et al. | |
| 2015/0374429 A1* | 12/2015 | Scheller | A61B 18/1445 606/51 |
| 2018/0193085 A1 | 7/2018 | Hanlon et al. | |

FOREIGN PATENT DOCUMENTS

| | | |
|---|---|---|
| JP | 2013-502248 A | 1/2013 |
| JP | 2017-94085 A | 6/2017 |
| RU | 2012108960 A | 9/2013 |
| WO | 2011/089718 A1 | 7/2011 |
| WO | 2017211915 A1 | 12/2017 |

OTHER PUBLICATIONS

Written Opinion dated Aug. 17, 2020 for International Application No. PCT/US2020/035088 (4 pages).
Extended European Search Report issued in European Application No. 20814152.3, date of mailing: Jul. 8, 2022, 8 pages.
Japanese Office Action and the English translation issued in Japanese Application No. 2021-570899, date of mailing: Sep. 2, 2022, 6 pages.

\* cited by examiner

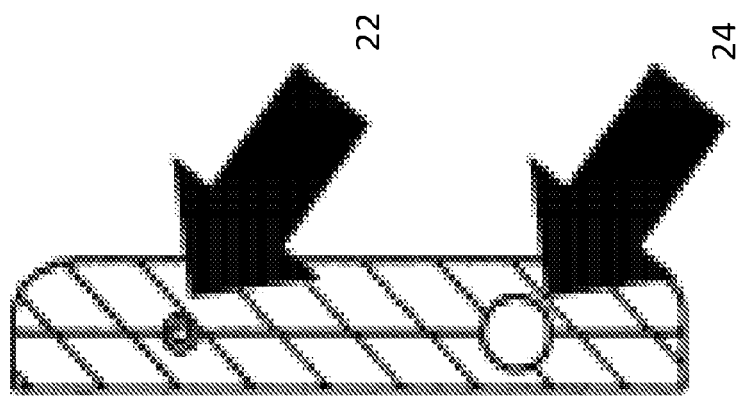
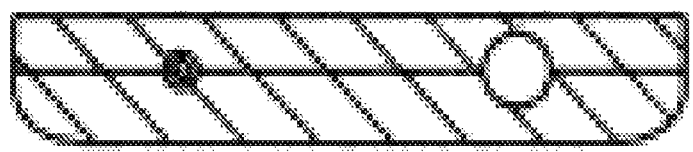
FIG. 5

BIOCOMPATIBLE METAL DEVICES FOR DELIVERING ABLATIVE ENERGY

CROSS-REFERENCE TO RELATED APPLICATIONS

The present application claims benefit of U.S. Provisional Application No. 62/855,472, filed May 31, 2019 and U.S. Provisional Application No. 62/855,477, filed May 31, 2019, the contents of each of which is incorporated by reference herein in their entirety.

FIELD OF THE INVENTION

The present disclosure relates generally to disposable, bipolar ablative forceps and probes that are designed to deliver energy for the ablation of tissue while designed to prevent the sticking of body tissue to the contact ends of the devices.

BACKGROUND

Ablation therapy is a type of minimally invasive procedure medical professionals (i.e., surgeons) use to destroy abnormal tissue that presents in many conditions or to coagulate and seal tissue following surgery.

Bipolar forceps that deliver ablative energy are typically constructed with a pair of electrode arms having proximal ends that are connected to electrical conductors and opposite distal ends with tips that contact and grasp or pinch body tissue between the tips during use of the forceps. When the forceps arms are manually manipulated by the surgeon to grasp body tissue between the distal end tips of the arms, an electric current is completed from one forceps arm through the body tissue to the other forceps arm. This current passing through the forceps tips and the body tissue heats the forceps tips and the body tissue held between the tips and causes the tissue to be joined or coagulated.

Ablative probes can also be used to deliver ablative energy. The ablative probe may comprise an elongated shaft with a distal end comprising a tip. The probe can be introduced into a patient's body to deliver directed energy for ablation to tissue from the tip of the distal end of the probe.

For patient safety reasons, it is required that the portions of the ablative forceps or probe that contact the body tissue be constructed or formed of a biocompatible material that will not react with the body tissue. The biocompatible material commonly used on the tips the devices is an expensive metal such as stainless steel, titanium, tungsten, gold, or silver. The use of this metal on the device tips is a significant factor in the manufacturing costs of the forceps.

Even still, however, the heat produced from the ablative devices can result in pieces of the body tissue sticking to the biocompatible material. As a result, sterilization of the devices following the surgical procedure requires scrubbing or scraping of the device tips to remove the body tissue, resulting in a portion of the expensive biocompatible metal being removed from the tips. Over a period of time and after several uses and subsequent cleaning of the device tips, a sufficient amount of the biocompatible metal can be removed from the devices to where the biocompatible material will no longer contact the body tissue in use of the instrument.

To prolong the useful life of bipolar electrosurgical devices, the thickness of the layer or amount of biocompatible metal at the devices distal end tips needs to be increased. With the increased amount of biocompatible metal on the distal end tips, the forceps can be used and sterilized a greater number of times before the biocompatible metal is worn away from the device tips by repeated sterilizations and scrubbing and scraping of the tips. However, due to the type of biocompatible metal (i.e., gold, silver, etc.) used on the devices' distal end tips, increasing the thickness of the metal significantly increases the cost of the surgical instrument.

Ablative forceps and ablative probes may also comprise a lumen that extends through the forceps or probe to deliver a conductive fluid, such as perfuse saline, to the distal ends of the forceps or probe for perfusion into the surrounding tissue. Conductive fluid has been shown to reduce the local temperature of the tissue being ablated, minimizing tissue vaporization and charring. To make use of the conductive fluid, the distal ends of the device, or the entirety of the forceps electrode arms or probe shaft are composed of a porous structure to allow for the conductive fluid to be conveyed through the lumen and out through the porous structure into adjacent tissue during the ablation process.

Porous structures used in the prior art are formed using a sintering process, which involves compacting a plurality of particles (preferably, a blend of finely pulverized metal powders mixed with lubricants and/or alloying elements) into a shape, and then subjecting the blend to high temperatures. When compacting the particles, a controlled amount of the mixed powder is automatically gravity-fed into a precision die and is compacted, usually at room temperature at low pressures. Once it is ejected from the die, and will be sufficiently rigid to permit in-process handling and transport to a sintering furnace. Other specialized compacting and alternative forming methods can also be used, such as powder forging, isostatic pressing, extrusion, injection molding, and spray forming. During sintering, the unfinished material is placed within a controlled-atmosphere furnace, and is heated to below the melting point of the base metal, held at the sintering temperature, and then cooled. The sintering transforms the compacted mechanical bonds between the powder particles to metallurgical bonds. The interstitial spaces between the points of contact will be preserved as pores. The amount and characteristics of the porosity of the structure can be controlled through powder characteristics, powder composition, and the compaction and sintering process.

SUMMARY OF THE INVENTION

Sintered materials, however, are brittle and cannot be used to form the whole or a significant part of the working parts of reusable ablative devices that require biocompatible metals. This is because the sintered materials lack strength and cannot provide the needed thickness or durability of biocompatible metals needed to prolong the useful life of electrosurgical devices.

There exists a need for ablative devices that provide a biocompatible metal at the point of contact with the tissue of the subject with porosity to allow for the conveyance of conductive fluid to the tissue. Moreover, there remains a need for ablative devices constructed in a manner that reduces manufacturing costs and that may also enable disposal of the device after one use.

Fused Mesh

The present invention provides for ablative devices comprising biocompatible materials in the form of a mesh to provide porosity to allow for the conveyance of conductive fluid to target tissue. In aspects of the invention, the mesh may comprise a fused mesh. The mesh may further comprise sintered biocompatible materials. The mesh allows for varying thickness of the biocompatible material provided to be used together with reusable and disposable devices. The mesh used in devices of the present invention may be uniformly woven (or calendared) with an industrial roller and laminated in a furnace under mechanical weight. In aspects of the invention, the mesh becomes fused (diffusion bonded) under high-temperature of inert gas inside the furnace, resulting in individual wires and each adjacent layer of the mesh bonding to one another. Once it has cooled in a controlled environment, the mesh is rigid. Advantageously, over non-mesh sintered metal, the mesh, even if composed of sintered materials, is exceptionally strong and can be used for sub-micron filtration of liquids and can withstand high pressure while maintaining a steady filter rating. The mesh does not require any internal support, which makes it durable and easy to clean without the loss of material over time. The mesh is further resistant to extremely high temperature, heavy mechanical pressure, oxidation, hydraulic pressure, corrosion, and abrasion.

The biocompatible material in the mesh may be silver, gold, titanium, tungsten, or stainless steel. The biocompatible material may be sintered. In a preferred embodiment the mesh is a sintered stainless steel mesh. Advantageously, the mesh comprises multiple layers bonded together, e.g. fused. For example, the biocompatible material may be a 1, 2, 3, or 5 layer mesh. Meshes of biocompatible material may be those sold by TWP Inc., headquartered in Berkley, California.

Meshes used in the devices of the present invention may available in a multiple widths and thicknesses which a person of ordinary skill will be able to select according to the needs of the device.

Advantageously, because the mesh of biocompatible material is porous, liquid can filter through the mesh. A person of ordinary skill will also be able to select a micron rating suitable for the needs of the device. In aspects of the present invention, the mesh of biocompatible material may have a micron rating of 1-50. For example, the mesh may have a micron ration about 15-35. The mesh may have a micron rating of 25.

Bipolar Forceps

Accordingly, in an aspect of the invention, provided are forceps comprising first and second pincers, each pincer having an intermediate body portion, a proximal portion extending from the body portion, and a distal portion extending form the body portion. The forceps have at least one lumen extending to the distal portion of the first pincer, second pincer, or both the first pincer and second pincer, a first electrical conductor operably linked to a source of electrical energy and the proximal end of the first pincer, a second electrical conductor operably linked to a ground and the proximal end of the second pincer, and conductive tips operably connected to the distal portion of each pincer. Advantageously, the conductive tips comprise a mesh of biocompatible material. Each conductive tip is in fluid communication with the at least one lumen and is configured to allow passage of a fluid from the at least one lumen through the mesh to the exterior of the conductive tips. The forceps are configured to deliver electrical energy for ablation to the conductive tips of the distal portions of the first and second pincer when compressed towards one another.

In further aspects of the invention, the forceps are configured to deliver fluid from the at least one lumen to the exterior of the conductive tips when the first and second pincer are compressed towards one another. For example, the energy for ablation may be bipolar energy.

Advantageously, the body portion, distal portion, and/or proximal portion of the forceps may comprise a mesh of biocompatible material. When a portion of the device comprises the mesh, that portion may be in fluid communication with the at least one lumen to allow for conveyance of a fluid to the exterior of the device and to a target tissue.

In an aspect of the invention the forceps are disposable. The advantage of using disposable forceps is that the thickness of the mesh that would be needed to extend the longevity of non-disposable forceps can be reduced. For example, in disposable forceps the thickness of the mesh on each pincer tip may be in a range of 12.7 micrometers to 127 micrometers.

Advantageously, the mesh of the present invention can be used in combination with reusable forceps. For example, in embodiments comprising reusable forceps the thickness of the mesh may be about 1700 micrometers.

Ablation Probe

In another aspect of the invention is provided a probe comprising an elongated shaft having a proximate end and a distal end, at least one lumen extending to the distal end of the elongated shaft, a first electrical conductor operably linked to a source of electrical energy and the proximal end of the elongated shaft, and one or more conductive tips operably connected to the distal portion of the elongated shaft comprising a mesh of biocompatible material. The one or more conductive tips are in fluid communication with the at least one lumen and configured to allow passage of a fluid from the at least one lumen through the mesh to the exterior of the one or more conductive tips and the probe is configured to deliver electrical energy for ablation to the conductive tip of the distal portion of the elongated body when in contact with target tissue.

In an aspect of the invention the probe is configured to deliver fluid from the at least one lumen to the exterior of the one or more conductive tips when the one or more conductive tips are in contact with target tissue. Advantageously, the elongated shaft of the probe may comprise a mesh of biocompatible material. When the elongated body comprises the mesh, the elongated body may be in fluid communication with the at least one lumen to allow for conveyance of a fluid to the exterior of the body and to a target tissue.

In an aspect of the invention the probe is disposable. The advantage of using a disposable probe is that the thickness of the mesh that would be needed to extend the longevity of non-disposable probe can be reduced. For example, in a disposable prove the thickness of the mesh on conductive tip may be in a range of 12.7 micrometers to 127 micrometers.

Advantageously, the mesh of the present invention can be used in combination with reusable probes. For example, in embodiments comprising reusable probes the thickness of the mesh may be about 1700 micrometers.

BRIEF DESCRIPTION OF THE DRAWINGS

Features and advantages of the claimed subject matter will be apparent from the following detailed description of embodiments consistent therewith, which description should be considered with reference to the accompanying drawings, wherein:

FIG. 5 is an illustration of a cross-section of pincers of forceps of the invention.

Figure 1:
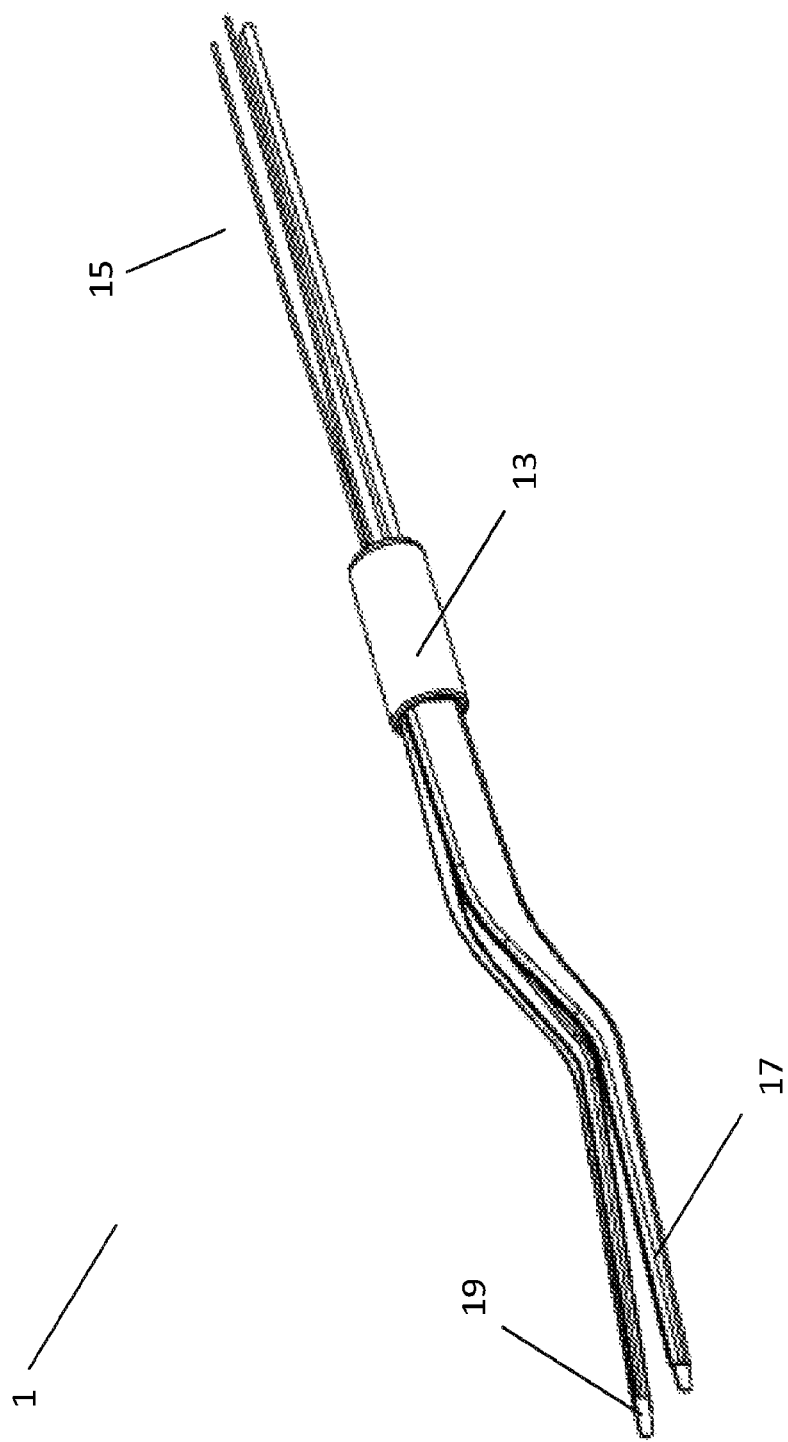
FIG. 1 is an illustration of an embodiment of a forceps of the invention.

For a thorough understanding of the present disclosure, reference should be made to the following detailed description, including the appended claims, in connection with the above-described drawings. Although the present disclosure is described in connection with exemplary embodiments, the disclosure is not intended to be limited to the specific forms set forth herein. It is understood that various omissions and substitutions of equivalents are contemplated as circumstances may suggest or render expedient.

DETAILED DESCRIPTION

The present invention is generally directed to ablative devices comprising biocompatible materials in the form of a mesh to provide porosity to allow for the conveyance of conductive fluid to target tissue to be ablated. The mesh also increases the durability of the biocompatible material, reducing the amount of biocompatible material needed for both reusable devices and disposable ablative devices. Advantageously, the portion of the ablative devices that contacts the target tissue comprises the biocompatible material, thereby reducing tissue-sticking. Additionally, because the mesh is porous and allows for the conveyance of conductive fluid, tissue-sticking and further reduced. The devices allow for minimally invasive delivery of energy, for example radio frequency (RF) energy, to target tissue. The mesh used in the present invention may comprise a fused mesh. The mesh may further comprise sintered biocompatible materials.

In a first aspect of the invention, provided are forceps comprising first and second pincers, each pincer having an intermediate body portion, a proximal portion extending from the body portion, and a distal portion extending form the body portion. The forceps have at least one lumen extending to the distal portion of the first pincer, second pincer, or both the first pincer and second pincer, a first electrical conductor operably linked to a source of electrical energy and the proximal end of the first pincer, a second electrical conductor operably linked to a ground and the proximal end of the second pincer, and conductive tips operably connected to the distal portion of each pincer. Advantageously, the conductive tips comprise a mesh of biocompatible material. Each conductive tip is in fluid communication with the at least one lumen and is configured to allow passage of a fluid from the at least one lumen through the mesh to the exterior of the conductive tips. The forceps are configured to deliver electrical energy for ablation to the conductive tips of the distal portions of the first and second pincer when compressed towards one another. Forceps designs usable with the present invention are described in U.S. Pat. No. 8,361,070, the entirety of which is incorporated by reference.

In another aspect of the invention is provided a probe comprising an elongated shaft having a proximate end and a distal end, at least one lumen extending to the distal end of the elongated shaft, a first electrical conductor operably linked to a source of electrical energy and the proximal end of the elongated shaft, and a conductive tip operably connected to the distal portion of the elongated shaft comprising a mesh of biocompatible material. The conductive tip is in fluid communication with the at least one lumen and configured to allow passage of a fluid from the at least one lumen through the mesh to the exterior of the conductive tip and the probe is configured to deliver electrical energy for ablation to the conductive tip of the distal portion of the elongated body when in contact with target tissue. Ablative prove designs usable with the present invention are described in U.S. Pat. No. 7,993,335, the entirety of which is incorporated by reference.

FIG. 1 illustrates an embodiment of the forceps 1 of the present invention. The forceps comprise elongate pincers that each comprise a proximal end 15 and a distal end 17 and a body portion 13. At the end of the distal end 17 is a conductive tip 19. The pincers may have the same configurations and can be laser cut from a blank of aluminum or a biocompatible material. Stamping, water jet cutting, EDM, plasma cutting, or molding processes could also be used to form the forceps pincers. In aspects of the present invention, the forceps comprise injection molded plastic welded together to hold components in place.

Figure 2:
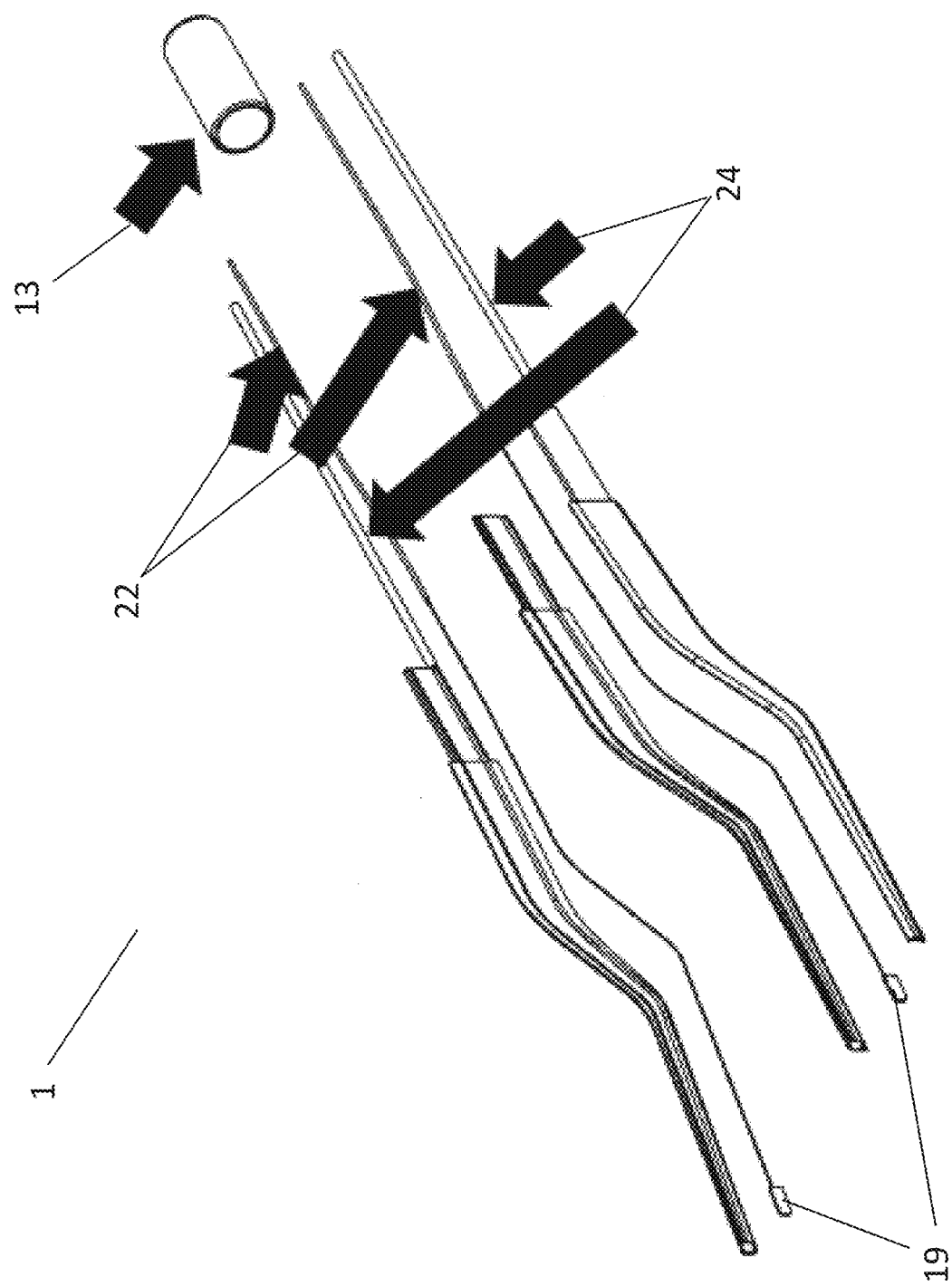
FIG. 2 is an illustration of an embodiment of a forceps with individual components isolated.

FIG. 2 illustrates the embodiment of the forceps 1 of FIG. 1 with individual component isolated. The forceps 1 comprise conductive wires 22 that connect the proximal end of each pincer of the forceps to an electrical conductor. In aspects of the invention, one pincer is connected to a source of electrical energy and the second pincer is connected to a ground. The forceps also comprise at least one lumen 24 that provide fluid to the distal end of the forceps. At the distal end is pictured the conductive tip 19 comprising the mesh of biocompatible material. The forceps can be manually compressed to bring the pincers together, thereby conducting energy for ablation from the conductive tip of one pincer through tissue to the conductive tip of a second pincer. The body 13 of the forceps slides over the pincers on the forceps, including the conductive wires and lumens, holding each together. In aspects of the present invention the body of the forceps is a hub with a Y junction holding the wiring and tubing in place. The hub may work together with the injection molded plastic to hold components in place. In an alternative embodiment, the pincers are secured together at their proximal ends, with the connecting region providing the body of the forceps. The electrical conductors may be secured to the pincers by a potting material that forms a base around the pincer proximal ends.

Figure 3:
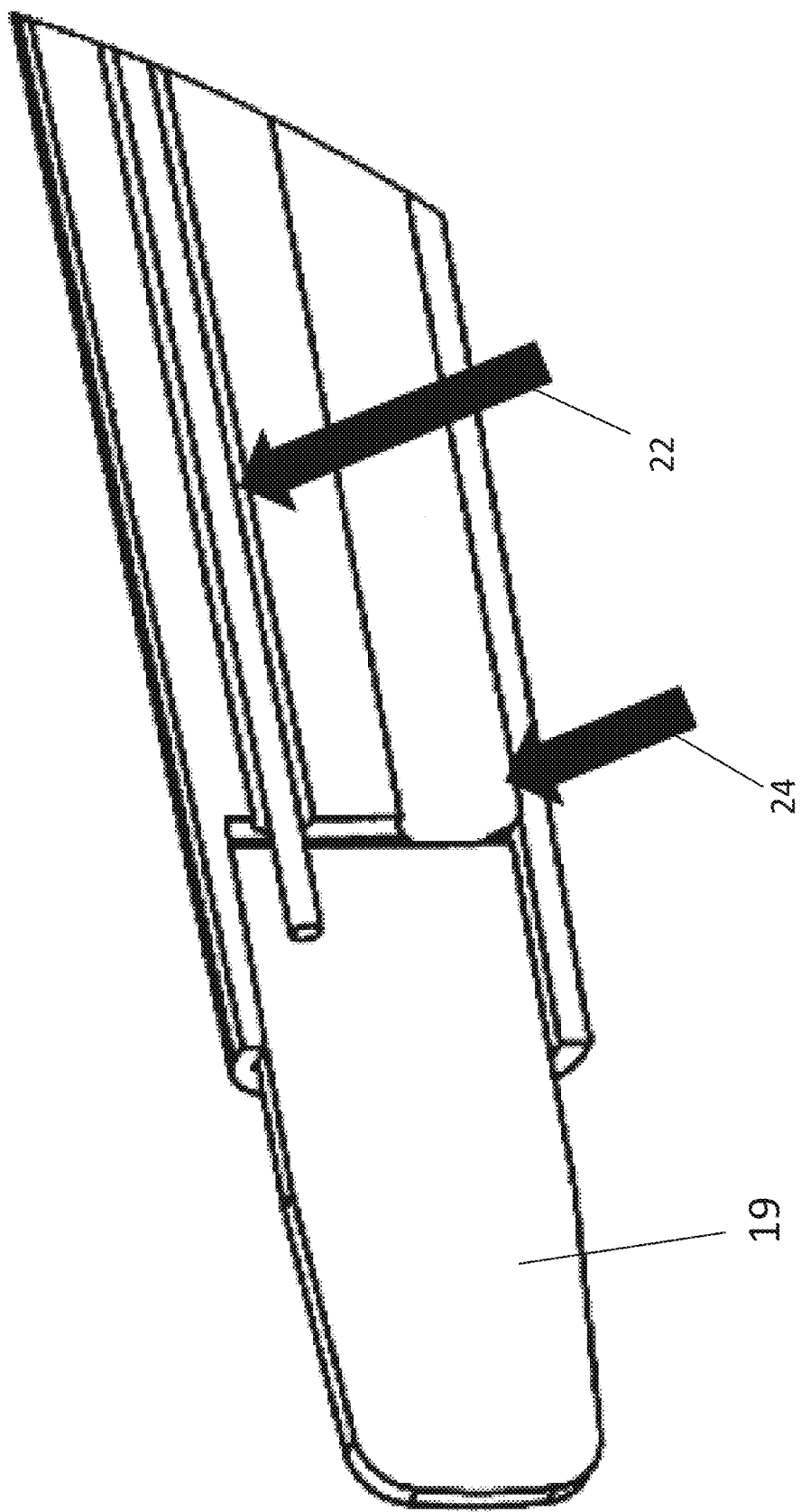
FIG. 3 is illustration an embodiment of a conductive tip of forceps of the invention.

FIG. 3 illustrates a close-up of a distal tip of forceps of the invention. The conductive tip 19 comprises a mesh of biocompatible material. The conductive wire 22 is in contact with the conductive tip 19, providing energy of ablation from the source of electrical energy to the conductive tip. The at least one lumen 24 is also provided to the distal end in fluid communication with the conductive tip 19 allowing for a conductive fluid to be provided to the exterior of the conductive tip through the porosity of the mesh and to the target tissue during ablation. The conductive tip can be crimped to the distal of each pincer. In aspects of the present invention, the conductive tip is removable. This is advantageous, because it allows for the conductive element comprising the biocompatible material to be replaced without needing to replace the entire device. The conductive tip may also be laser welded to the conductive wire to hold the tip of the assembly in place.

Figure 4:
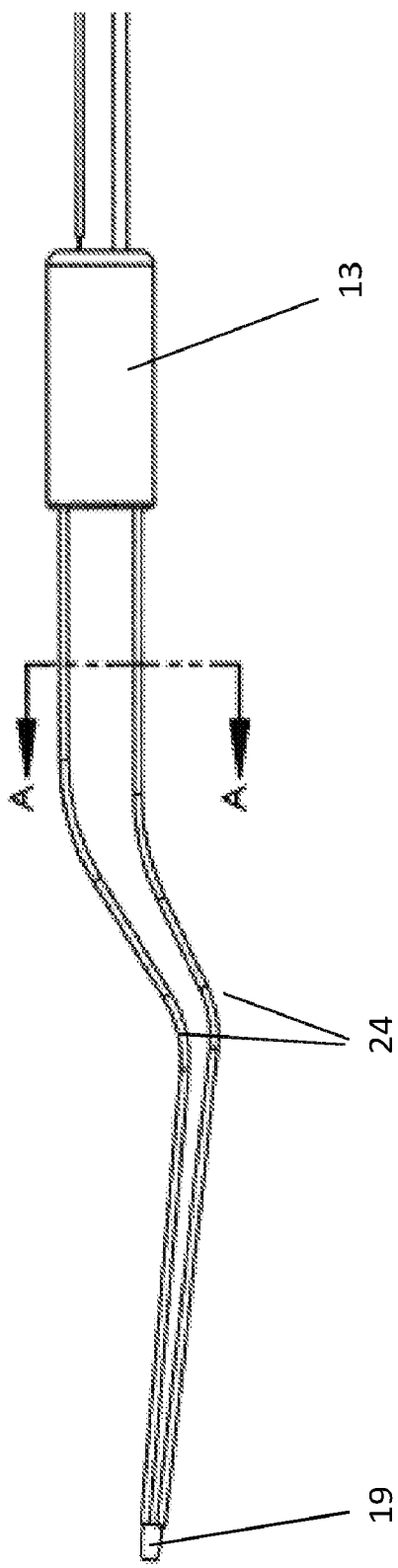
FIG. 4 is an illustration of the at least one lumen of forceps of the invention.

FIG. 4 illustrates an embodiment of the forceps of the invention with the body 13, one or more lumens 24 and distal tip 19 pictured. As pictured, the one or more lumens 19 extend from at least the body 13 to the distal end and conductive tip 19 of the pincers (not shown).

FIG. 5 illustrates a cross-section of pincers of the forceps. As shown, the conductive wire 22 and one or more lumens 24 is housed within the pincers of the forceps and extends through the pincers to the distal end of the forceps.

Figure 6:
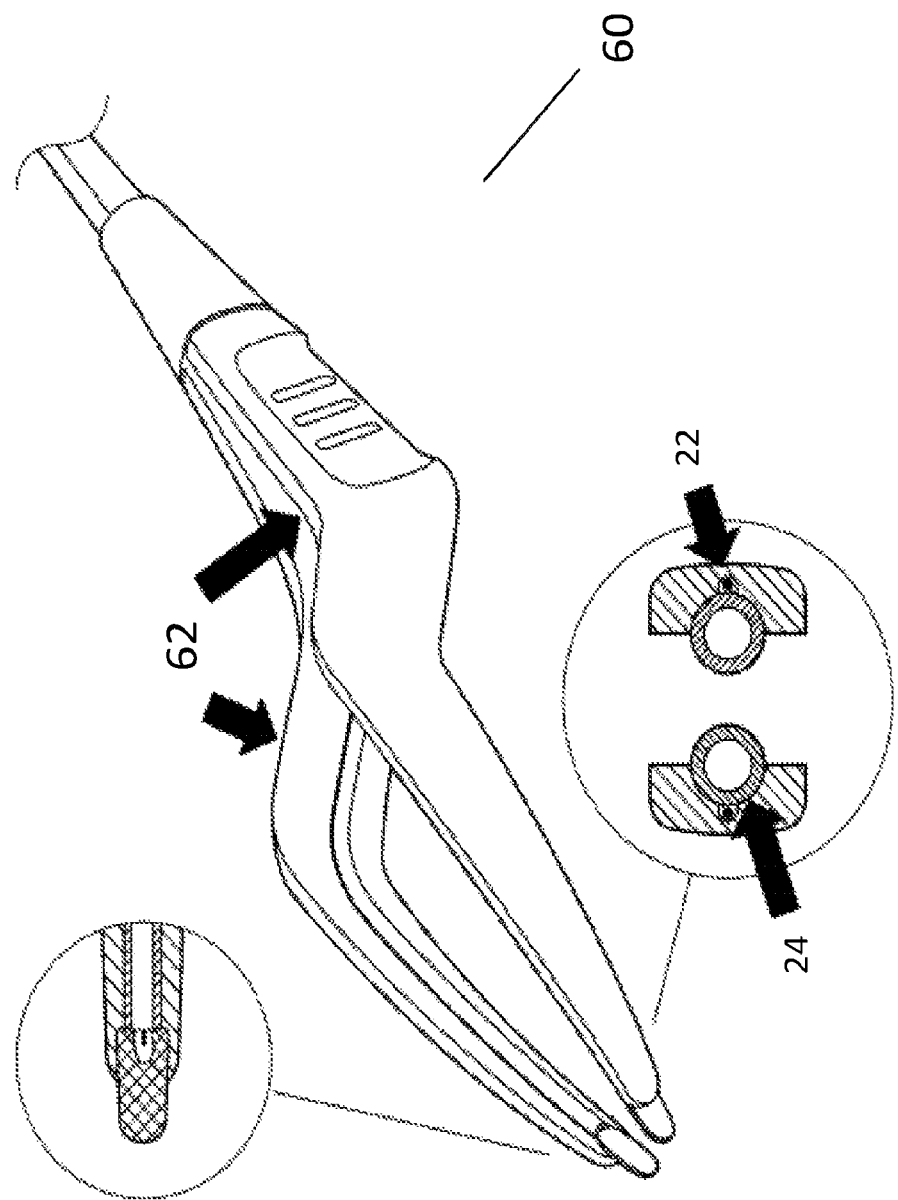
FIG. 6 is an illustration of an embodiment of forceps of the invention.
Figure 7:
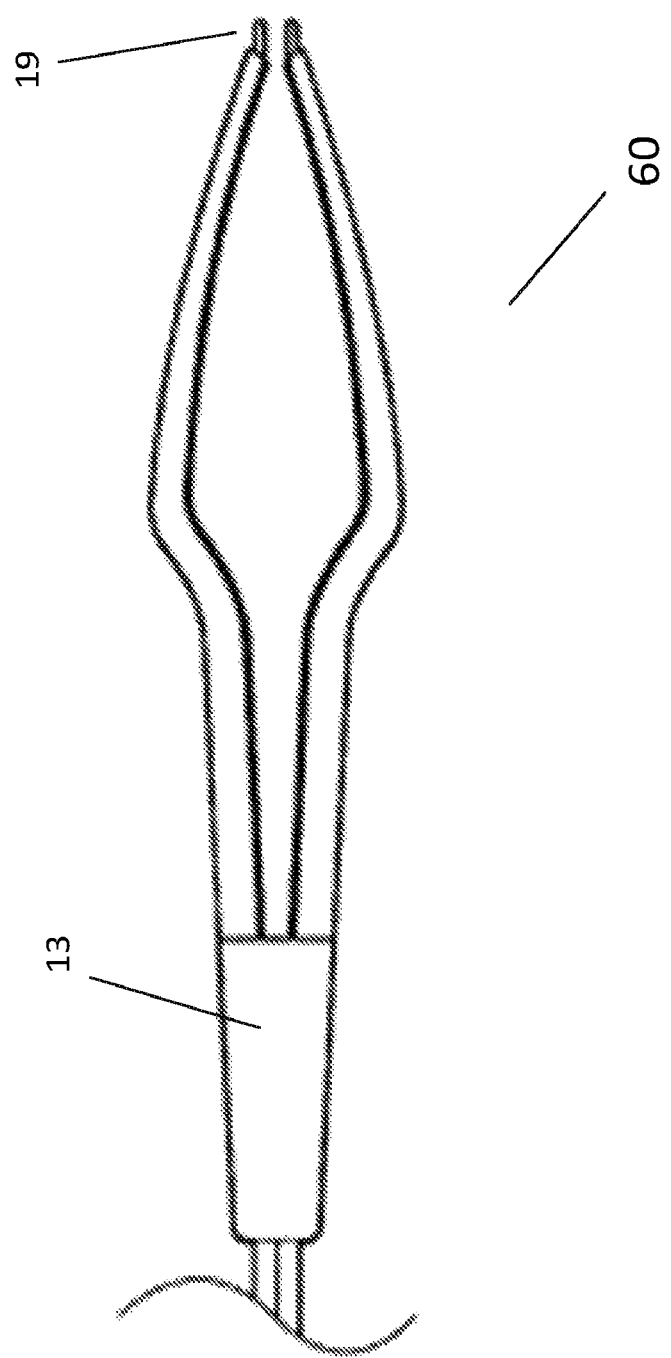
FIG. 7 is an illustration of an embodiment of forceps of the invention.

FIG. 6 and FIG. 7 illustrate another embodiment of the forceps 60 of the present invention. The intermediate portion of the pincer 62 is shaped and dimensioned to be held comfortably by a single hand of a surgeon using the forceps. The pincers may be constructed of aluminum, stainless steel, brass, tin, copper, a biocompatible material, or an alloy of these materials. The pincers may also be constructed of a plastic material. In embodiments comprising a plastic material, an conductive wire 22 extends the length of the pincers to deliver the energy from ablation from the source of electrical energy to the distal end of the forceps. The one or more lumens 24 may also be designed to extend the length of the pincers to deliver conductive fluid to the distal end of the forceps. A body portion 13 holds the proximal end of the two pincers together and secures the wire and one or more lumen ends to the pincer proximal ends. The body portion 13 has a hollow interior and may comprise an electrically insulating material. Cords pass through the body to extend from the source of fluid or electrical energy to the distal end of the forceps.

The intermediate portion of the pincers of the forceps or the body of the forceps may be completely covered in an insulating coating. The coating may be electrically insulating and/or may also be thermally insulating. The coating covers only the intermediate portion of the pincer, leaving the pincer proximal end portion and the pincer distal end portion projecting and exposed from the coating layer. A much thinner layer of insulated coating may advantageously be applied if the forceps are designed to be disposable rather than reusable.

Figure 8:
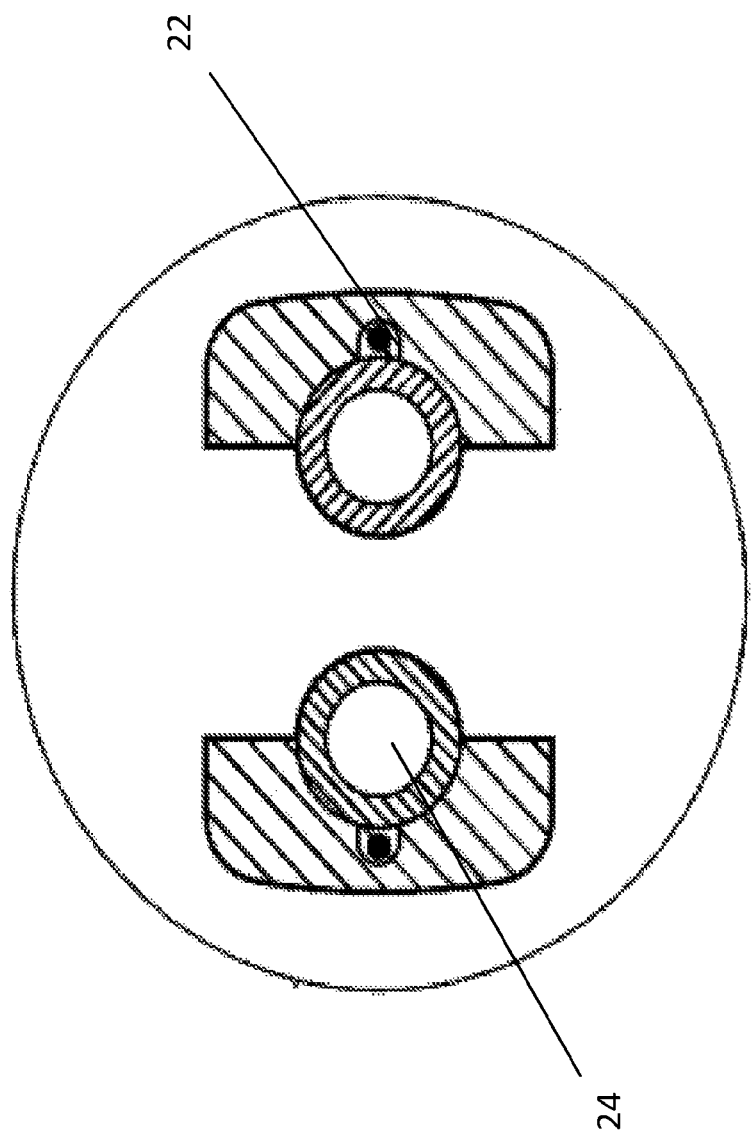
FIG. 8 is an illustration of a cross-section of pincers of the forceps of the invention.

FIG. 8 illustrates a close-up of the cross-section of pincers depicted in FIG. 6. As shown the conductive wire 22 is housed laterally of the one or more lumens 24 and extends along the pincers of the forceps. The one or more lumens 24 may also extend laterally from the housing provided the pincers of the forceps, thereby being partially exposed, the conduct wires 22 may be entirely housed in the pincers of the forceps.

Figure 9:
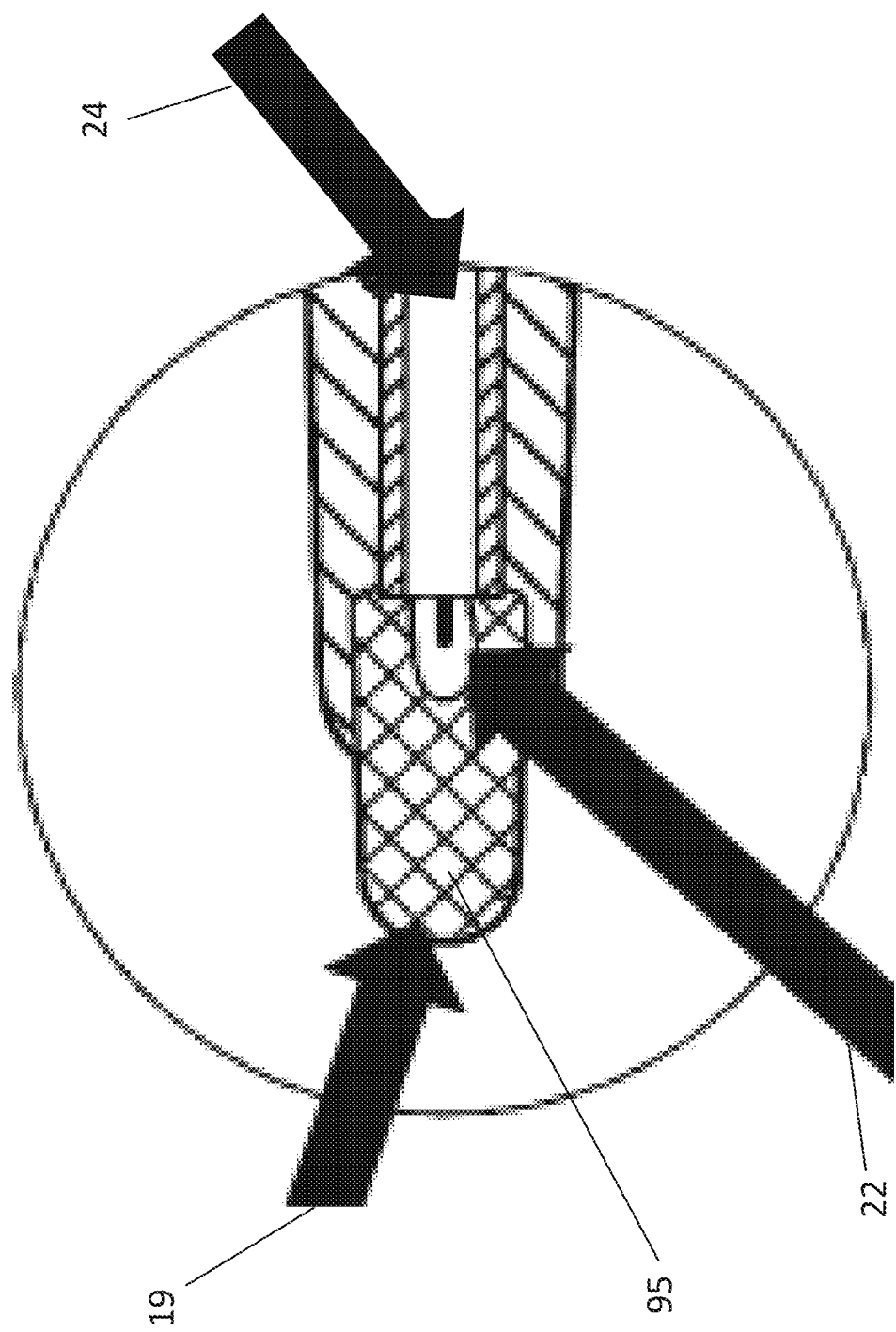
FIG. 9 is illustration an embodiment of a conductive tip of forceps of the invention.

FIG. 9 illustrates a close-up of the distal end of pincers of an embodiment of the forceps of the invention. Illustrated is the cross-hashing of the mesh 95 of biocompatible material of the conductive tip of the forceps 19. The one of more lumens 24 extends to the distal end of the forceps and is in fluid communication with the distal tip to allow for conductive fluid to be conveyed through the mesh of the conductive tip to the exterior of the conductive tip and to the target tissue being ablated. The conductive wire 22 extends passed the one or more lumens 24 to operably conduct energy for ablation to the conductive tip 19. The conductive wire 22 may be laser welded to the conductive tip.

Conductive wires 22 of the present invention can be any known conductive elements and wires and can be made from any known conductive material. The conductive wires 22 may be conventional and may comprise one or more insulating layers. In aspects of the invention the conductive wires extend from the proximal end of the forceps to the distal end of the forceps, conducting and delivering the energy for ablation. The conductive wire can be help in place by any means that allow for the energy to continue to be conducted. For example, the end of the wire may be crimped to hold the wire in place or laser fused to one or more components. The length of the cords allow the pincers to be easily manipulated by the hand of the surgeon when connected with the electrical source.

Figure 10:
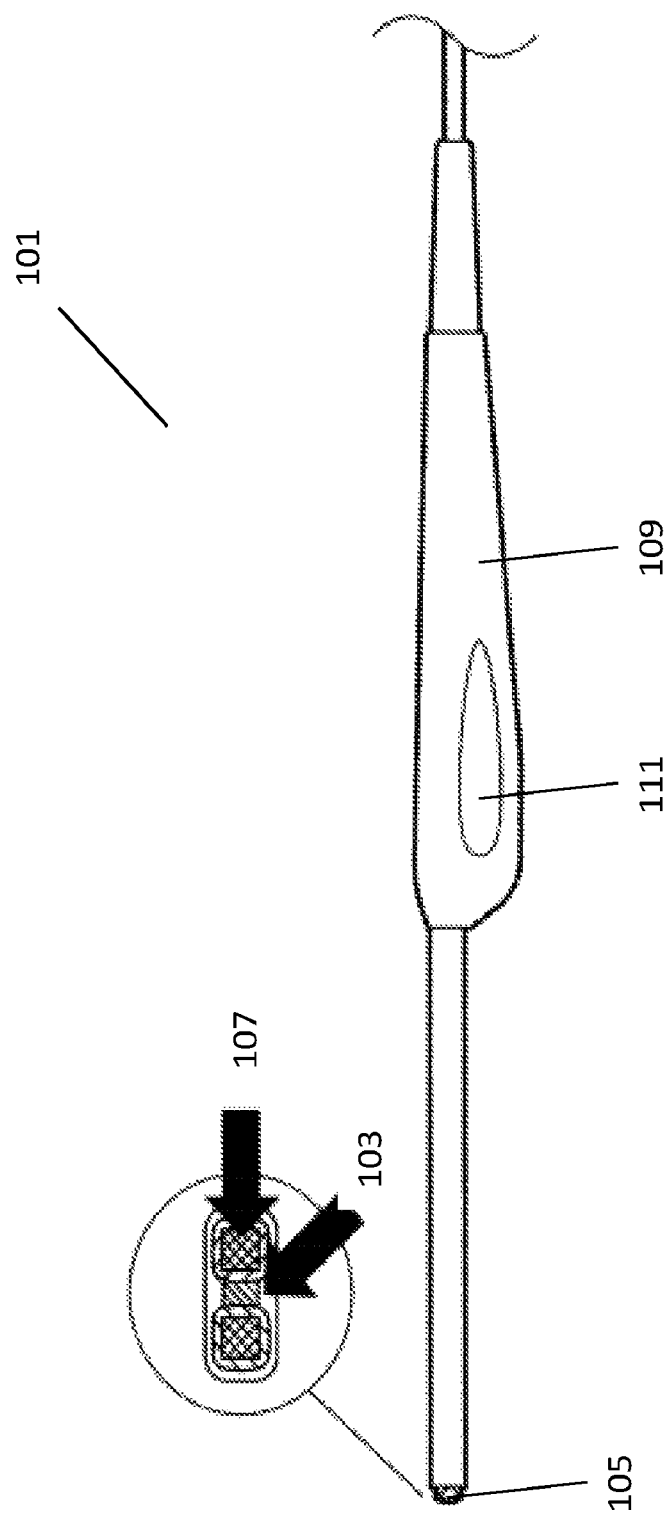
FIG. 10 is an illustration of an embodiment of a probe of the invention.

FIG. 10 illustrates an ablative probe 101 of an embodiment of the present invention. The probe comprises an elongate body 109 and two conductive tips 105 comprising meshes of biocompatible material 107 and optionally an inert spacer 103. The inert spacer may preferably comprise a plastic material. The advantage of providing an inert spacer is that it allows one conductive tip to be electrically coupled to the source of electrical energy and the second conductive tip to the electrically coupled to a ground. By using a setup with at least two conductive tips, bipolar energy for ablation can be provided.

Figure 11:
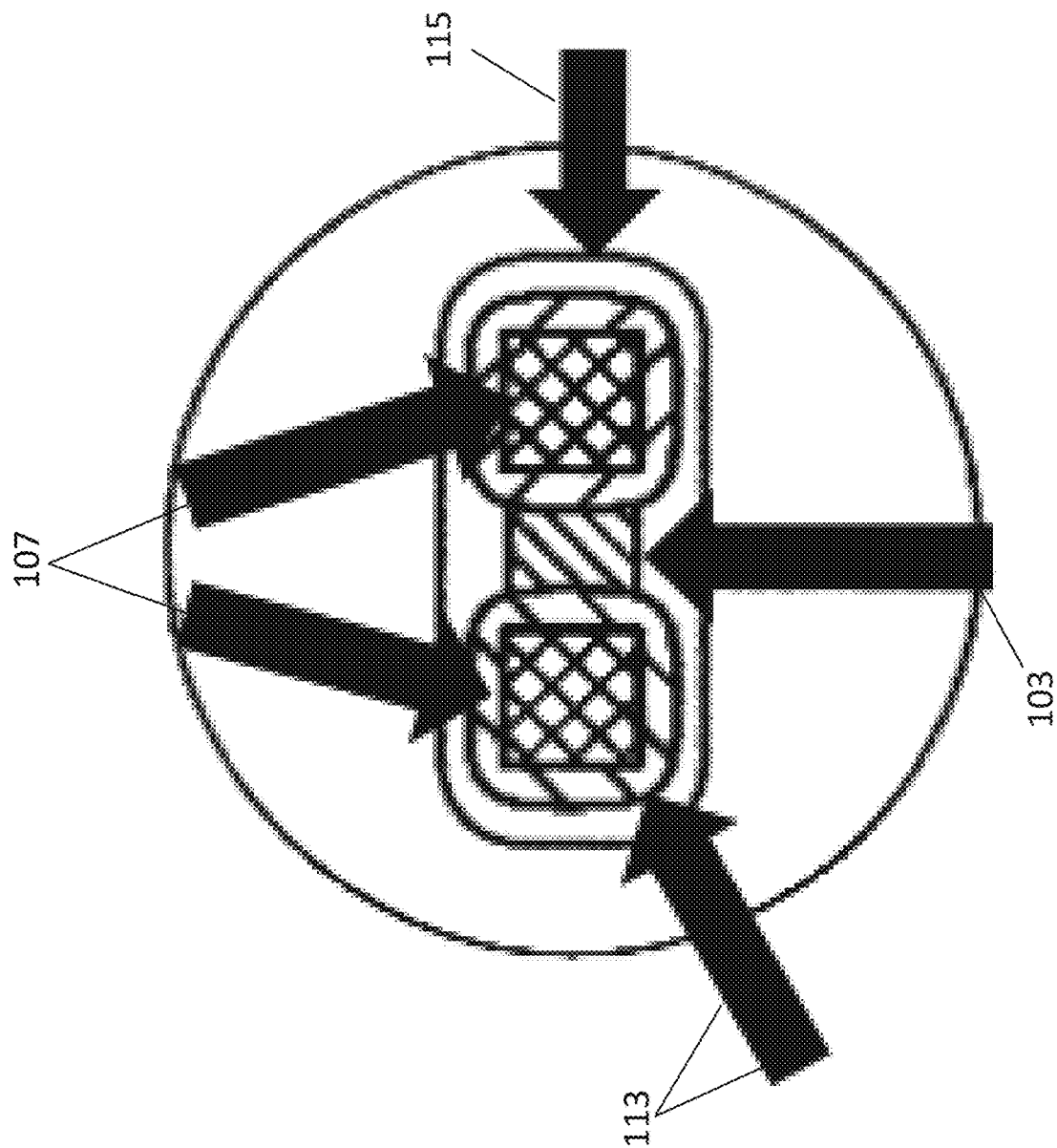
FIG. 11 is a cross-section of a conductive tip of a probe of the invention.

FIG. 11 illustrates a close-up of the cross-section of the distal end 105 of the ablative probe illustrated in FIG. 10. The elongate body 115 may be heat shrunk or extruded over the distal end 105 to tightly house the two conductive tips 107. A spacer, preferably of an inert material such as plastic, is provided 103 to separate the two conductive tips. Pictured behind each conductive tip 107 is a lumen 113 in fluid communication with the conductive tips to convey fluid from the one or more lumens, through the pores of the mesh to the exterior of the mesh and thereby the target tissue. Behind each conductive tip 107 is a conductive wire (not pictured) providing energy for ablation to each conductive tip. In aspects of the invention, the probe is configured to deliver electrical energy for ablation to the conductive tips of the distal portion of the elongated body when in contact with target tissue. In aspects of the invention, the elongate body may comprise or may further comprise a button 111 or control mechanism usable by the surgeon to trigger conduction of energy of ablation to the distal end of the probe 105 and thereby to the target tissue and/or to convey conductive fluid through the one or more lumens to the distal end 105 of the probe and to the target tissue through the mesh of the conductive tips 107.

Figure 12:
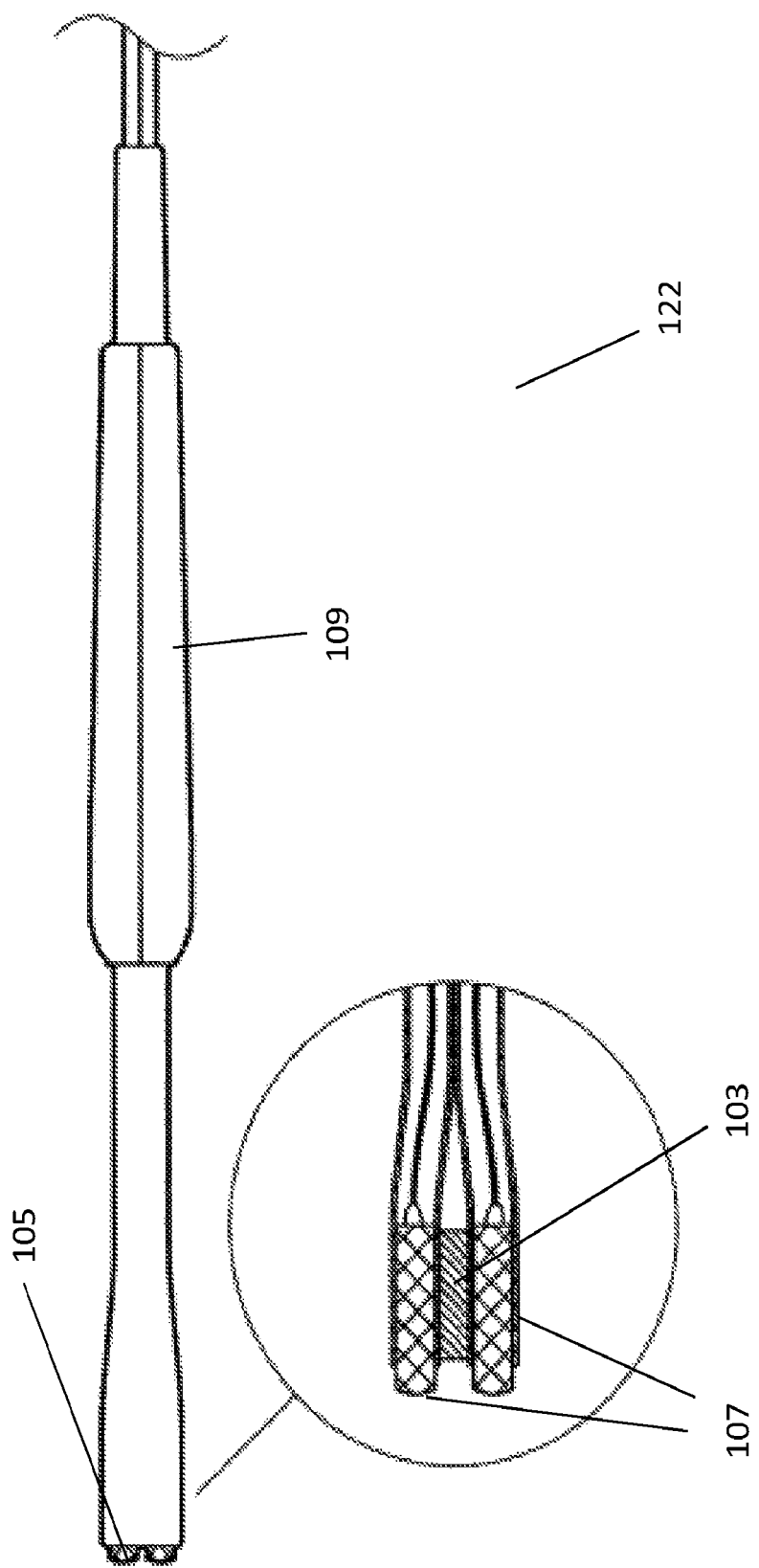
FIG. 12 is an illustration of an embodiment of a probe of the invention.

FIG. 12 illustrates a side view of the ablative probe 122 of the invention pictured in FIG. 10. The ablative probe comprises an elongate body 109, a distal end 105, and two conductive tips 107 comprising meshes of biocompatible material and an inert spacer 103. As pictured, a two piece plastic assembly for the intermediate portion of the elongate body 109 allows for tubing and wiring to fit through the hollow body of the ablative probe.

Figure 13:
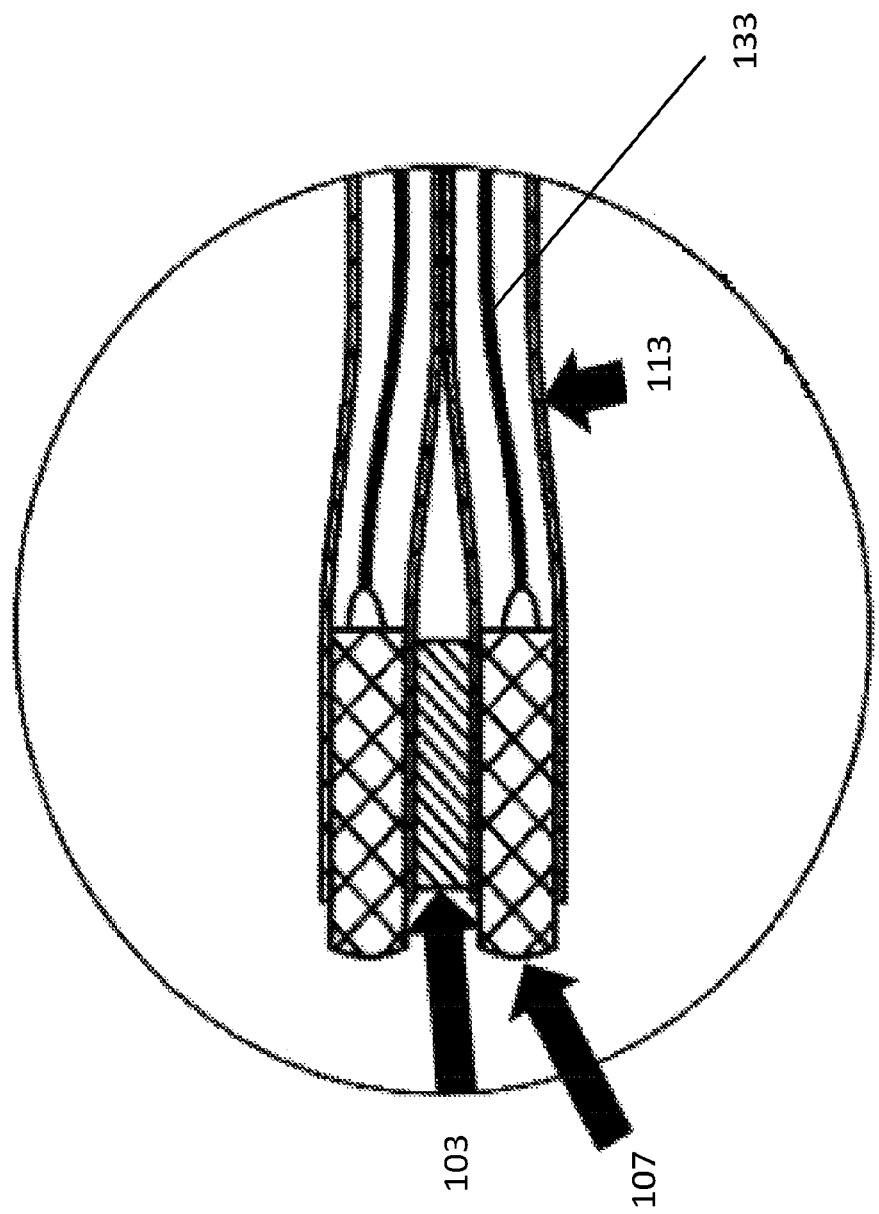
FIG. 13 is a cross-section of a conductive tip of a probe of the invention.

FIG. 13 illustrates a close-up of the cross-section of the distal end 105 of the ablative probe illustrated in FIG. 12. Shown are the one or more lumens 113 extending along the length of the elongate body to the distal end of the ablative probe. Each lumen is in separate fluid communication with each conductive tip 107. Also shown are the one or more conductive wires 133 extending along the length of the elongate body to the distal end of the ablative probe. Each conductive wire 133 is in separate communication with each conductive tip 107. Each conductive wire 133 may also be housed within the one or more lumens 113 in fluid communication with each conductive tip 107. Additionally, each conductive tip 107 is separated by an inert spacer 103. Because the conductive tips 107 are independently coupled to the conductive wires 133, one conductive tip can be coupled to the source of electrical energy, and the other conductive tip can be coupled to a ground. The conductive wires 133 may be welded to the conductive tips 107.

Figure 14:
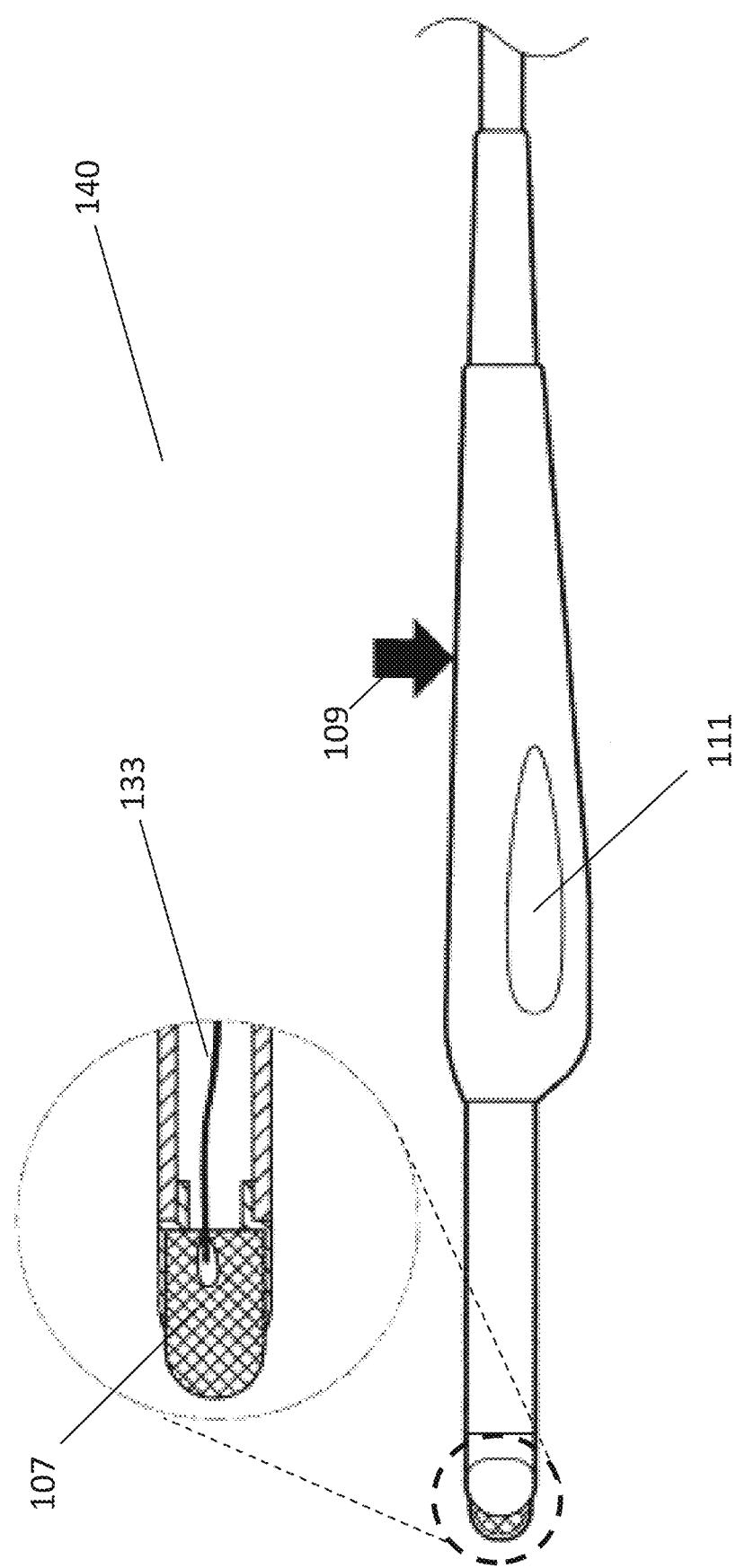
FIG. 14 is an illustration of an embodiment of a probe of the invention.

FIG. 14 illustrates another embodiment 140 of an ablative probe of the invention. The probe comprises an elongate body 109 and a single conductive tip 107 comprising a mesh of biocompatible material 107. Because only a single conductive tip 107 is provided the device 140 preferably transmits monopolar radiation. A conductive wire 133 extends along the length of the elongate body 109 to the distal end of the ablative probe. The elongate body comprises a button 111 or control mechanism usable by the surgeon to trigger conduction of energy of ablation to the distal end of the probe 105 and thereby to the target tissue and/or to convey conductive fluid through the one or more lumens to the distal end 105 of the probe and to the target tissue through the mesh of the conductive tips 107. As pictured, a two piece plastic assembly for the intermediate portion of the elongate body 109 allows for tubing and wiring to fit through the hollow body of the ablative probe. In an aspect of the invention, the conductive tip 107 has a circular or ovular shape and is beveled around the entire hemisphere of the outward portion of the conductive tip 107.

Figure 15:
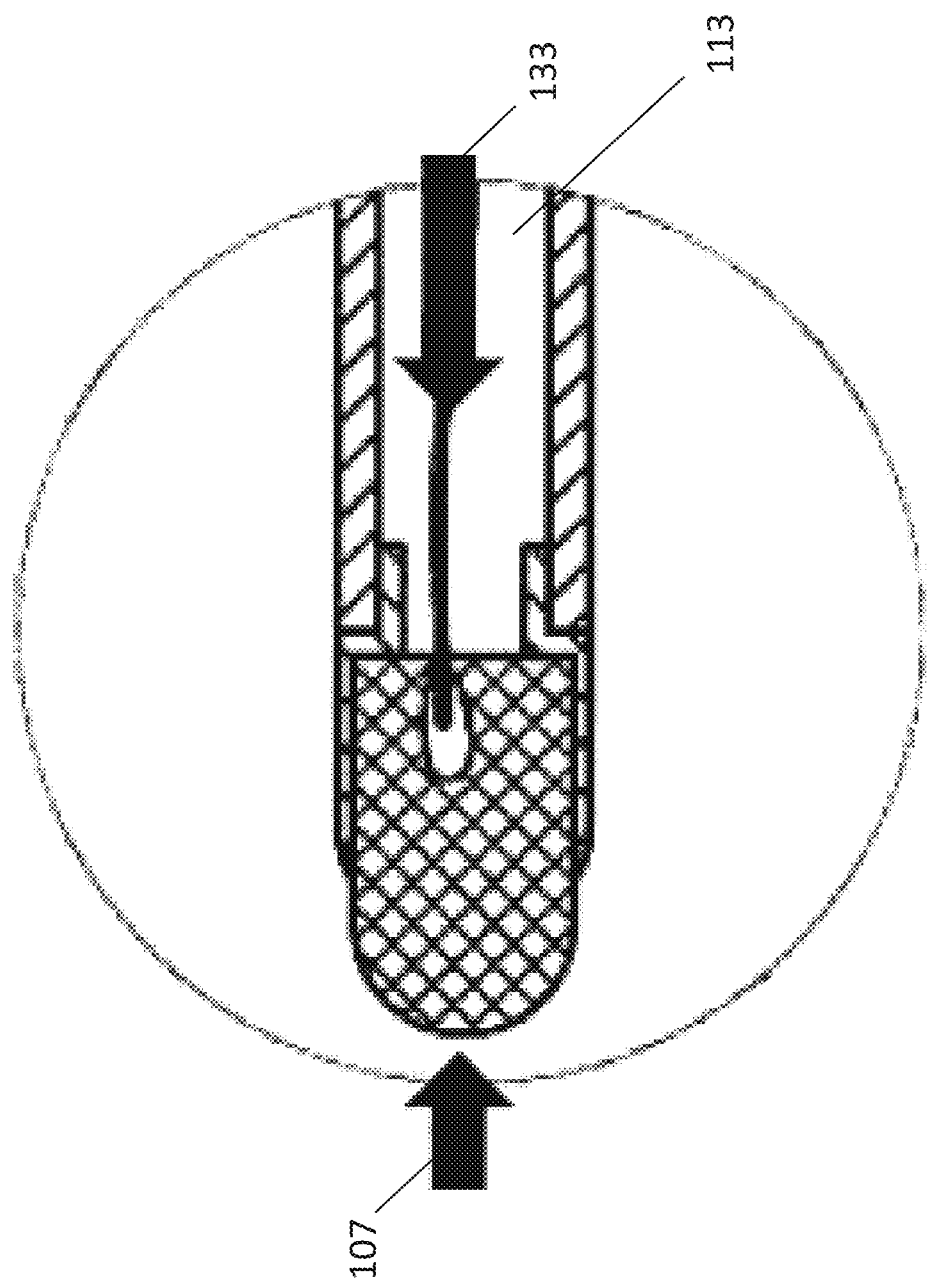
FIG. 15 is a cross-section of a conductive tip of a probe of the invention.

FIG. 15 a close-up of the cross-section of the distal end 140 of the ablative probe illustrated in FIG. 14. A conductive wire extends along the length of the elongate body 109 to the distal end of the ablative probe to provide energy for ablation to the conductive tip 107. The conductive wire 133 may be laser welded to the conductive tip and may be housed inside the one or more lumens 113 in fluid communication with the conductive tip. The conductive tip 107 has a circular or ovular shape and is beveled around the entire hemisphere of the outward portion of the conductive tip 107.

Figure 16:
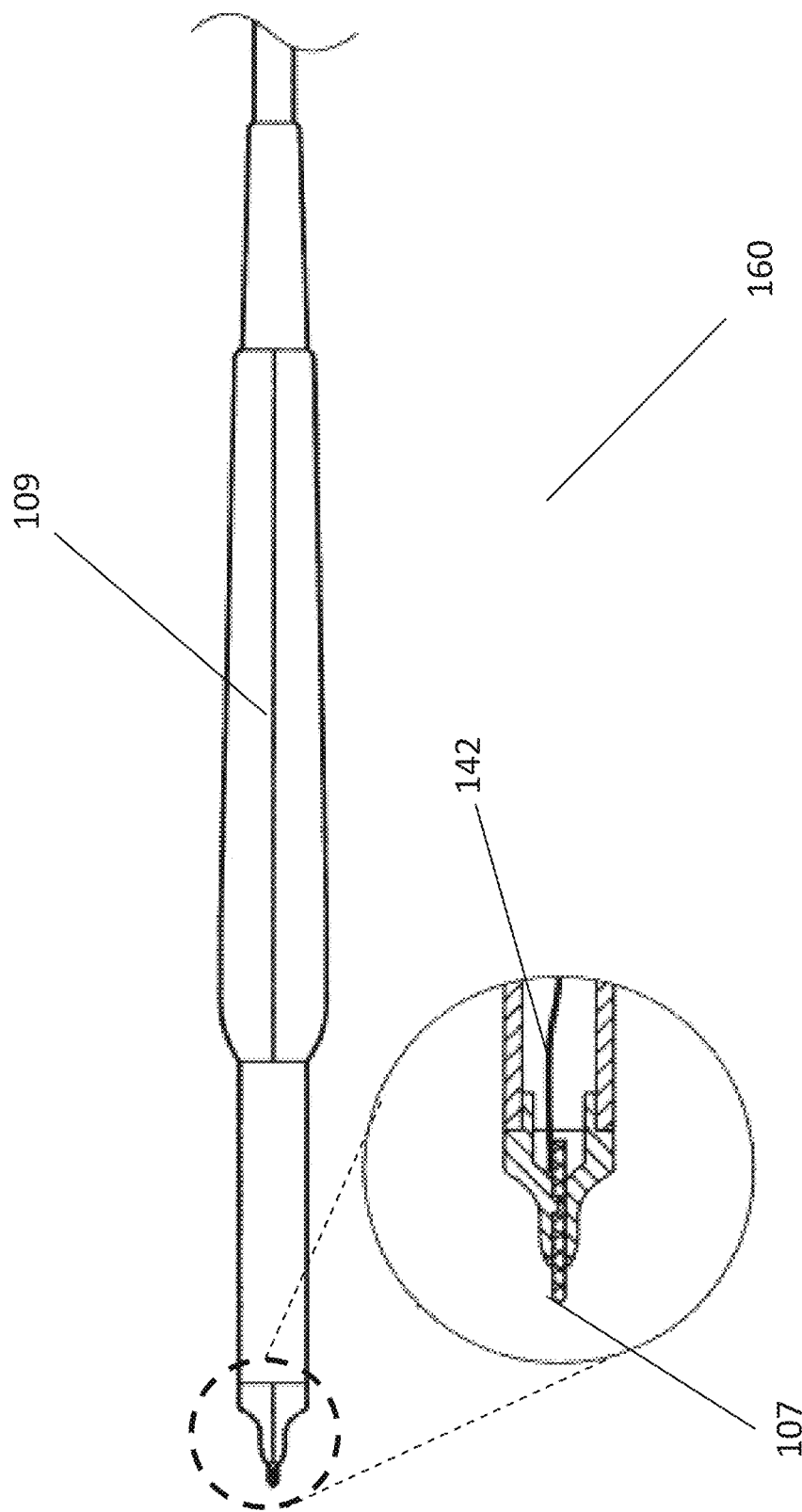
FIG. 16 is an illustration of an embodiment of a probe of the invention.

FIG. 16 illustrates another embodiment 160 of an ablative probe of the present invention. The ablative probe 160 comprises a two piece plastic assembly for the intermediate portion of the elongate body 109, allowing for tubing and wiring to fit through the hollow body of the ablative probe. A conductive wire 142 extends along the elongate body to the distal tip of the ablative probe to provide energy for ablation to the conductive tip 107 of the probe. In an aspect of the invention, the conductive tip 107 has a pointed tip. The pointed tip of the conductive tip 107 may have a beveled edge.

Figure 17:
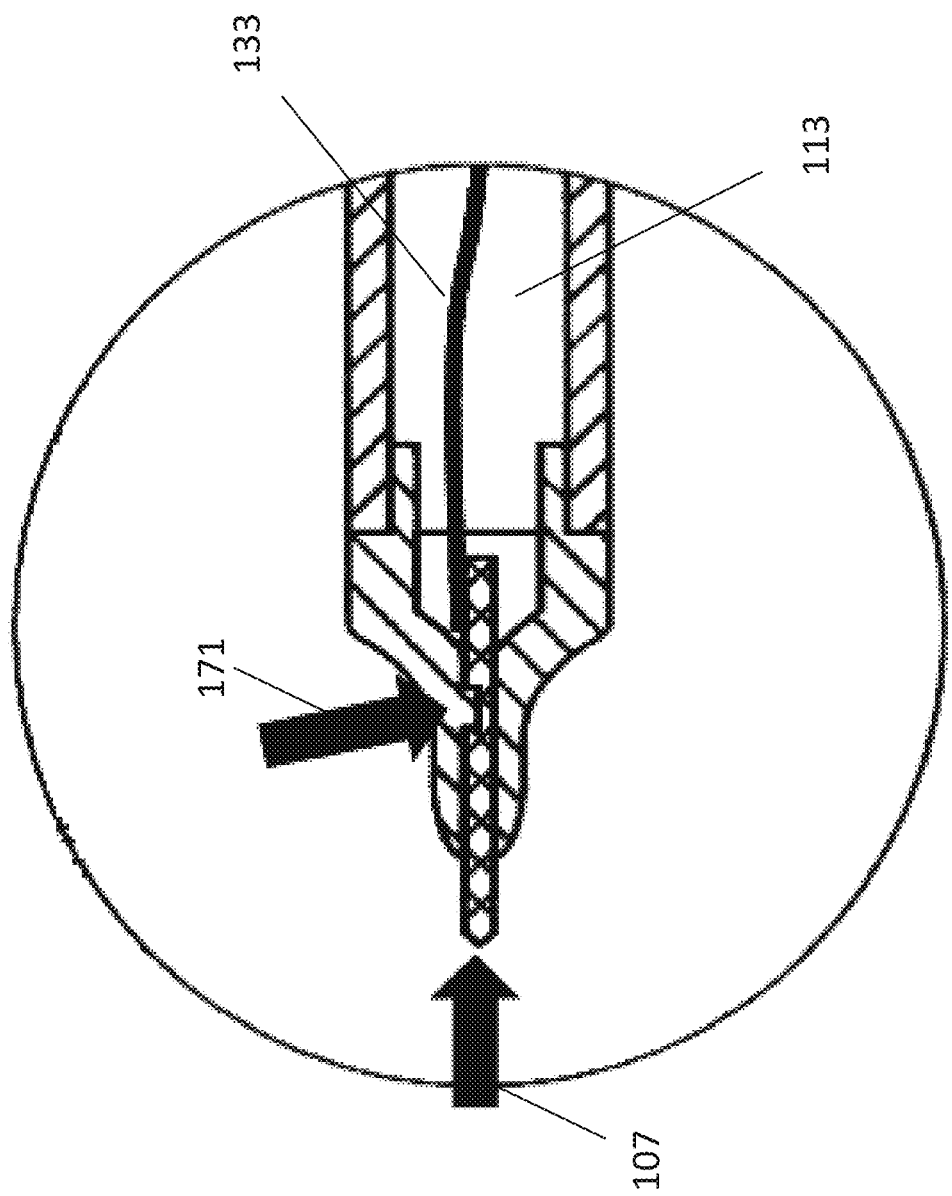
FIG. 17 is a cross-section of a conductive tip of a probe of the invention.

FIG. 17 illustrates a close-up of the cross-section of the distal end 140 of the ablative probe illustrated in FIG. 16. The conductive wire extends along the elongate body to provide energy for ablation to the conductive tip. The conductive wire 133 may be housed within the one or more lumens 113 in fluid communication with the conductive tip 107. The conductive tip 107 is pointed with a beveled edge. A netch 171 locks the conductive tip 107 into place in the distal end of the probe. Advantageously, when a netch or other physical fixing mechanism is present, adhesives or welding do not need to be used to hold the conductive tip 107 in place. Moreover, the conductive tip 107 can be removed and replaced with ease. Because only a single conductive tip 107 is provided the device 160 preferably transmits monopolar radiation.

Figure 18:
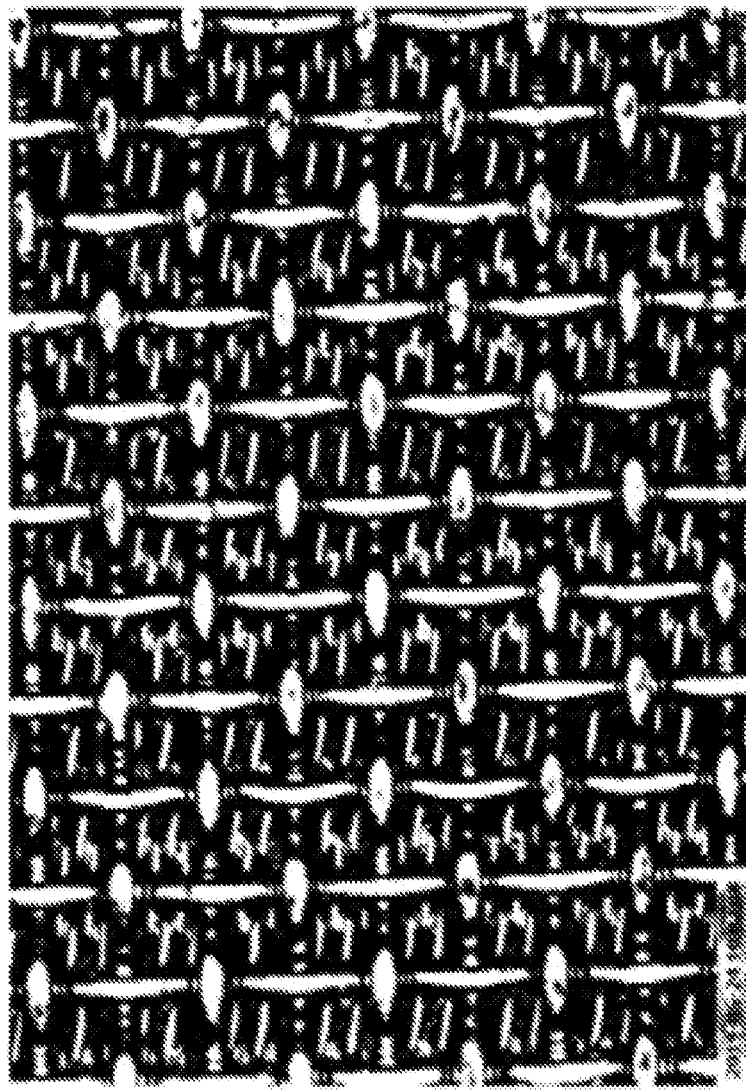
FIG. 18 is a close-up illustration of an embodiment of a layer of mesh used in devices of the invention.

FIG. 18 depicts a close up of a mesh of biocompatible materials used in devices of the present invention.

Figure 19:
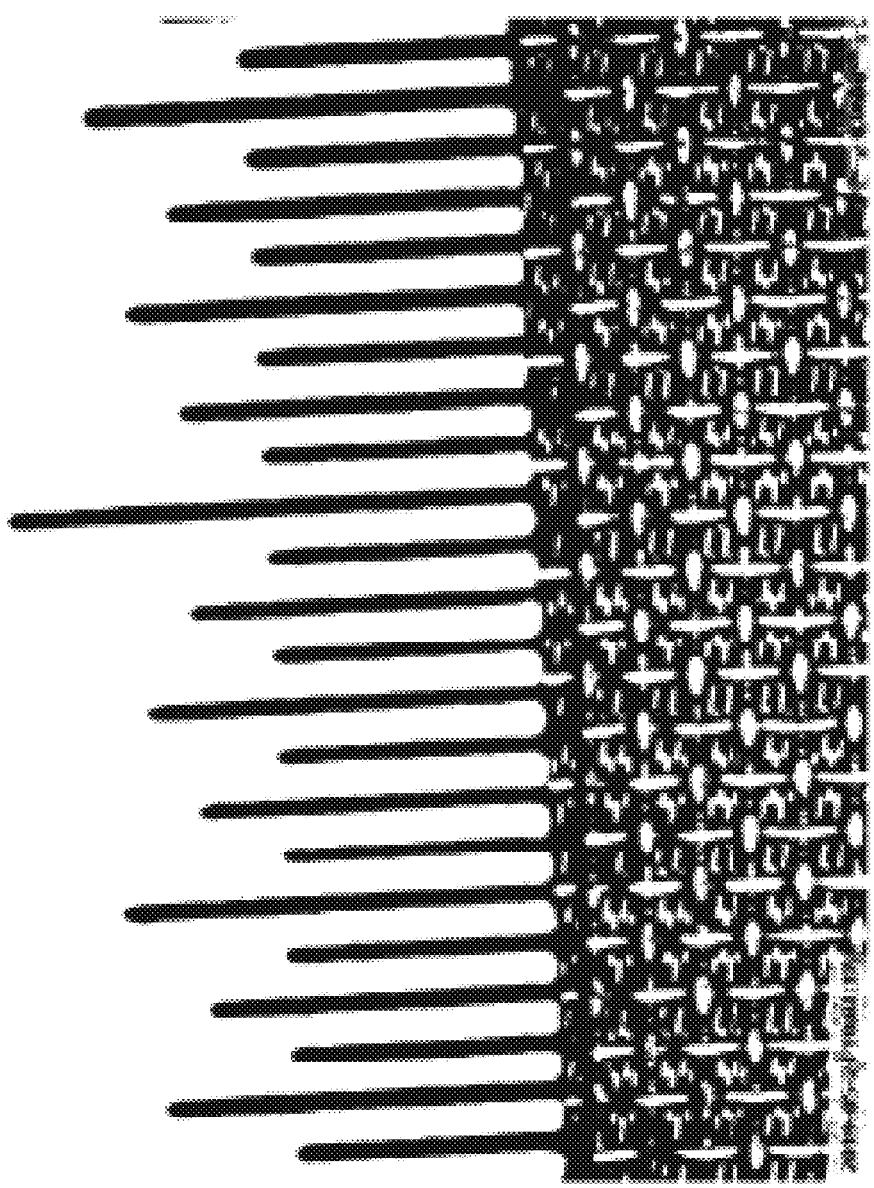
FIG. 19 is a close-up illustration of an embodiment of a layer of mesh used in devices of the invention with an accompanying size scale.

FIG. 19 depicts a close-up of the patterning of the mesh of the biocompatible materials used in devices of the present invention with the comparative size depicted.

In aspects of the invention, the mesh of biocompatible material has a porosity of 20-80 percent or 30-70 percent. The mesh may also be microporous in order to increase the number of pores that will perfuse the fluid. The mesh may also have interconnecting pores that are arranged in a random manner, in order to provide a more efficient flow of fluid through the porous structure. Higher porosity allows fluid to flow more freely through the mesh, porosity can be adjusted to depend on the desired flow of the fluid.

In the case of a microporous mesh, pores may have an effective diameter of 0.05-20 microns. Macroporous meshes may have pores with an effective diameter of 20-2000 microns. In preferred aspects of the present invention, the pores have a size of 1-50 microns. For example, the pores have an effective diameter of 15-35 microns. The pores may have an effective diameter of 25 microns.

Aspects of the invention may further provide a pump assembly configured to provide conductive fluid, such as saline, to the forceps or probes of the present invention. Pump assemblies usable with the present invention are described U.S. Pat. No. 5,279,569, the entirety of which is incorporated herein. For example, the pump assembly may comprise a source reservoir supplying fluid to the device. The fluid may optionally be cooled.

The source of electrical energy can be any source. In preferred aspects, the source is a source is an RF generator. Convention RF power supplies operate at a frequency in the range of 200 KHz to 1.24 MHz. Aspects of the invention are also operated with lower power supplies. For example, suitable power supplies may be capable of supplying ablation current and a voltage of below 150V, for example between 50V to 100V. The power supply may also provide a power output between 20 W and 200 W. As described above, RF energy may be monopolar or bipolar depending on the design of the device.

Both the pump assembly and source of electrical energy can be controlled by control circuitry. Controllers suitable for use with the devices of the invention are disclosed in U.S. Pat. No. 6,235,022, the entirety of which is incorporated by reference herein.

The devices of the present invention may provide energy for ablation anywhere in the body where ablation is needed. For example, the devices may be used in deliver ablation to a solid tumor or to tissue following a surgical procedure. Areas of the body to be ablated include, but are not limited to, the liver, kidney, pancreas, breast, prostate, or lung. The peripheral dimensions of the treatment region may be regular, e.g., spherical or ellipsoidal. Devices of the present invention may be used together with conventional imaging techniques capable of elucidating a target tissue such as ultrasonic scanning, magnetic resonance imaging (MM), computer-assisted tomography (CAT), fluoroscopy, nuclear scanning (using radiolabeled tumor-specific probes), and the like.

INCORPORATION BY REFERENCE

References and citations to other documents, such as patents, patent applications, patent publications, journals, books, papers, web contents, have been made throughout this disclosure. All such documents are hereby incorporated herein by reference in their entirety for all purposes.

EQUIVALENTS

Various modifications and further embodiments are possible beyond what is shown and described herein. The subject matter herein contains information, exemplification, and guidance that can be adapted to create various other embodiments.

What is claimed is:

1. Forceps comprising:
    first and second pincers, each pincer having an intermediate body portion, a proximal portion extending from the body portion, and a distal portion extending from the body portion;
    at least one lumen extending to the distal portion of the first pincer, second pincer, or both the first pincer and second pincer;
    a first electrical conductor operably linked to a source of electrical energy and the proximal end of the first pincer;
    a second electrical conductor operably linked to a ground and the proximal end of the second pincer; and
    conductive tips operably connected to the distal portion of each pincer, each conductive tip comprising a mesh of biocompatible material, wherein the mesh consists of 2, 3, or 5 fused layers, each conductive tip in fluid communication with the at least one lumen and configured to allow passage of a fluid from the at least one lumen through the mesh to the exterior of the conductive tips;
    the forceps configured to deliver electrical energy for ablation to the conductive tips of the distal portions of the first and second pincer when compressed towards one another.

2. The forceps of claim 1, wherein the forceps are configured to deliver fluid from the at least one lumen to the exterior of the conductive tips when the first and second pincer are compressed towards one another.

3. The forceps of claim 1, wherein the mesh of each conductive tip is about 1700 micrometers in thickness.

4. The forceps of claim 1, wherein the biocompatible material consists of silver, gold, titanium, tungsten, or stainless steel.

5. The forceps of claim 4, wherein the biocompatible material is sintered.

6. The forceps of claim 1, wherein the energy for ablation is bipolar energy.

7. The forceps of claim 1, wherein the body portion, distal portion, and/or proximal portion of the forceps comprise the mesh of biocompatible material.

8. The forceps of claim 1, wherein the forceps are disposable.

9. The forceps of claim 8, wherein the mesh on each pincer is in a range of 12.7 micrometers to 127 micrometers in thickness.

10. The forceps of claim 1, wherein the mesh has a micron rating of 1-50.

11. The forceps of claim 10, wherein the mesh has a micron rating of 15-35.

12. The forceps of claim 11, wherein the mesh has a micron rating of 25.

* * * * *